F. H. RISLEY.
COMBINED ROLLER AND BALL BEARING.
APPLICATION FILED JUNE 8, 1914.

1,149,542.

Patented Aug. 10, 1915.
3 SHEETS—SHEET 1.

Witnesses
Charles L. Reynolds
S. C. Whittington

Inventor
Frederick H. Risley
by Henry L. Reynolds
Attorney.

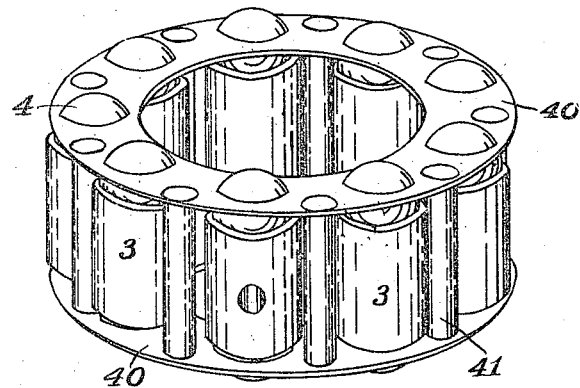
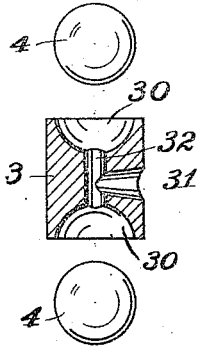
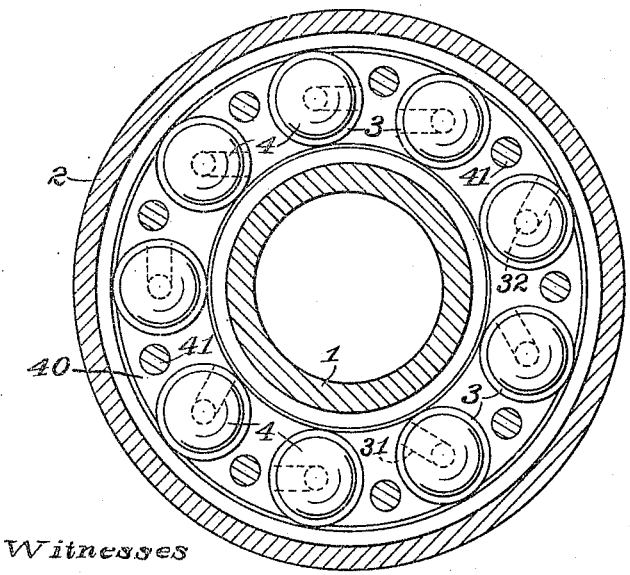

UNITED STATES PATENT OFFICE.

FREDERICK H. RISLEY, OF SEATTLE, WASHINGTON.

COMBINED ROLLER AND BALL BEARING.

1,149,542.  Specification of Letters Patent.  Patented Aug. 10, 1915.

Application filed June 8, 1914. Serial No. 843,896.

*To all whom it may concern:*

Be it known that I, FREDERICK H. RISLEY, a citizen of the United States, and resident of Seattle, King county, Washington, have invented certain new and useful Improvements in Combined Roller and Ball Bearings, of which the following is a specification.

My invention relates to journal bearings and consists of improvements in combined ball and roller bearings.

The object of my invention is to produce a bearing of this character which will be of superior wearing quality, produce less friction, and otherwise be simpler and better than other bearings which are in common use.

My invention comprises certain novel parts and combinations which will be described and illustrated, and more particularly defined in the claims.

In the accompanying drawings I have shown my invention embodied in the form which is now preferred by me.

Figure 1:
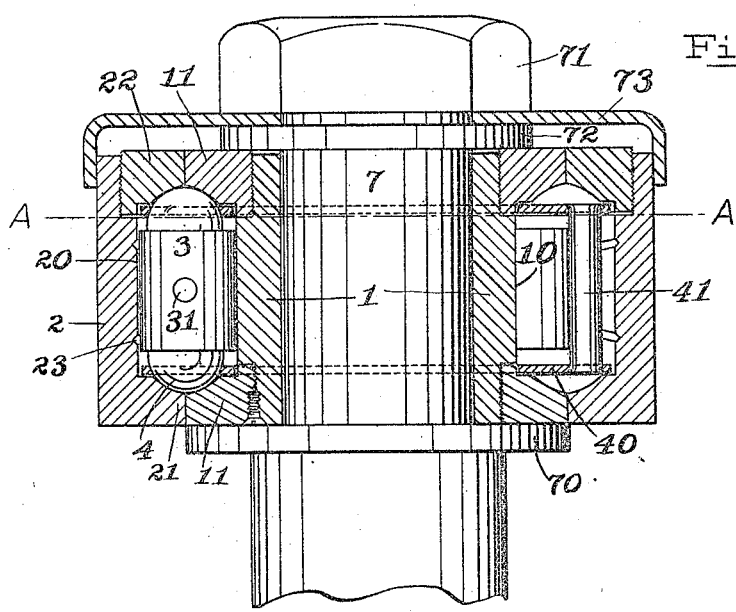
Figure 2:
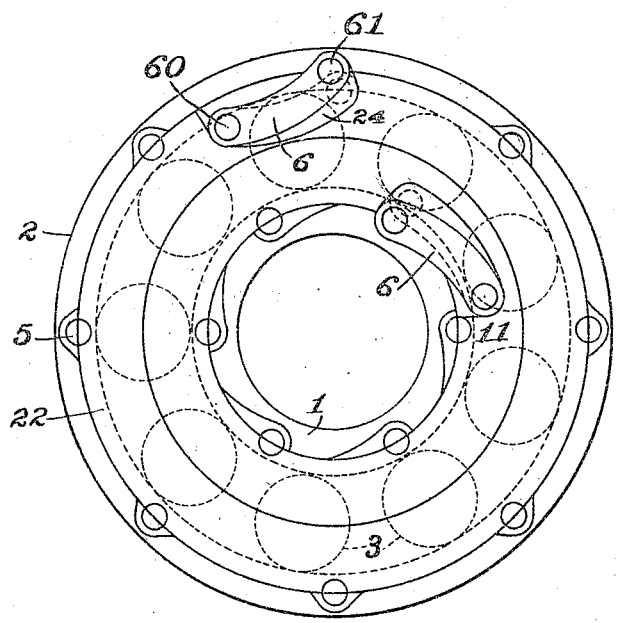
Figure 6:
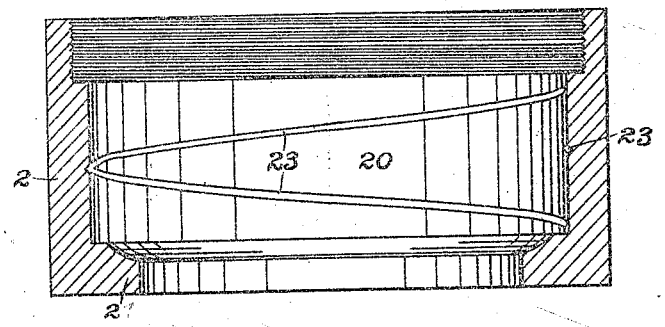

Figure 1 shows the members which constitute the bearing in an axial section. Fig. 2 is an outer side face view of the bearing. Fig. 3 shows the ball and roller elements of the bearing and the cage or retainer by which they are held in proper relative position. Fig. 4 is a section on the line A—A of Fig. 1. Fig. 5 is a longitudinal section through one of the rollers, with its associated balls adjacent, but removed from the sockets at the end of the roller. Fig. 6 is a section through the outer casing, showing the oil distributing grooves in the outer trackway.

My invention is adapted for use in any kind of bearing where the reduction of frictional resistance is desirable. For this reason I have not shown the bearing as associated with parts of any other mechanism, except as an axle is shown in Fig. 1. One of the principal uses to which this bearing would naturally be applied is for wheels of automobiles. The bearing, as herein shown, is complete and self-contained and has no relation to the specific construction of the two relatively rotative members between which it constitutes the bearing, except that each is provided with a seat adapted to receive and hold its respective part of the bearing. When used as a bearing for a vehicle wheel, said parts would be the axle and the wheel hub.

The bearing employs two trackway members, 1 and 2, the former having upon it the inner roll-trackway 10 and the latter having a complementary roll-trackway 20 of larger diameter, and facing the trackway 10. These two trackways are evenly spaced apart, by a series of rolls 3, of such size as to fit snugly against both trackway surfaces. The construction of the individual rolls is shown in Fig. 5. Each has a spheroidal cavity 30 in each end, an axial bore 32 connecting the end cavities, and a bore 31 connecting this axial bore with its outer periphery. Associated with these rolls are balls 4 which are of a size to snugly fit the cavities 30 in the ends of the rollers, and which form the moving parts of the axial or thrust bearing. To retain these balls and rolls in proper relative position, and also to facilitate their removal as a whole from the bearing, I provide two retainer rings 40, which rings have holes fitting over the balls, but of less diameter than the diameter of the balls, so that the balls can not pass therethrough. These two rings are secured in fixed relation, as by connecting bars or rods 41. By such means a casing is provided for the rollers and balls which holds them in assembled relation and permits their removal as a whole without displacement of any part in the assembly.

The inner member 1 of the bearing which carries the inner roll-trackway also carries two ball raceway segments 11. Both of these should preferably be made detachable from the member 1, as by threading them thereon, as is shown in Fig. 1. One of these might, under some conditions, be made integral with the member 1, although I prefer in the majority of cases to make them both separable. The outer casing 2 is also provided with two ball raceway segments. One of these, 21, I have shown as formed integral with the casing, while the other 22, is in the form of a ring screwing into the casing. I prefer that the line of division between the raceway segments which are carried by the inner and outer members 1 and 2 should be coincident in position with the circle which passes through the center of the balls, as is shown in Fig. 1.

I have provided means by which the rings 22 and 11 may be held in various adjusted positions, as may be required by slight variations in workmanship, and by wear of the parts, as well as by individual ideas of the closeness of adjustment which is desirable. Upon the line where the ring 22 joins with the outer casing 2 I provide a series of holes 5, which are one-half in the casing 2 and one-half in the ring 22. A thin strip 6 of metal is secured at one end by a pivot pin 60 to the ring 22. Its other end carries a locking pin 61, which is short in length, and of a size to snugly fit the holes 5. The bar 6 is of such character that its outer end, or that end which carries the pin 61 may be sprung or lifted up enough to free the pin from the hole 5 which it may occupy. When this is done the bar 6 may be moved to one side enough to cause the pin to rest upon the surface of the ring 22, or into the position indicated by dotted lines in Fig. 2. In this position the ring 22 may be turned in the casing to adjust the same. When the pin 61 occupies one of the holes 5 the ring is prevented from turning in the casing. I prefer to provide the ring 22 with a recess 24 of such size as will accommodate the bar 6 in both positions, thus making the outer surface of the bar 6 correspond with the outer surface of the ring 22. The inner ring 11 is locked in position by similar means.

It is evident that the member upon which is mounted the bar 6 which carries the locking pin 61, need have but one of the holes 5, as the pin could enter only one, but that the other member should have a series of said holes. As a matter of convenience of production, it might be desirable to bore each member at the same time, as has been shown in Fig. 2.

In placing a bearing of this kind in a wheel, the wheel hub would need to have a recess which would receive the outer roll-trackway member 2, and the end of the axle be of a size to fit within the bore of the inner trackway member 1. It is not intended that either of these should turn upon their respective wheel or axle member, although it is not necessary to take any especial means to prevent this. The friction in the bearing is so much less than between these other surfaces, that all movement will be confined to such roller bearing members.

I prefer to provide the outer roll-trackway surface 20 with slight grooves 23 which extend in a general helical direction from near the outer ends of this surface to the center thereof, the object of these being to distribute the oil or grease over said surface. The angular position of these grooves should correspond with the direction of principal rotation of the bearing, so that the effect of rolling movement of the rolls over this surface would be to force the oil or lubricant lengthwise these grooves and in a direction from the outer edges of the surface toward the center. The chamber which contains the rollers and the balls would be provided with a considerable quantity of lubricant, which would be of a paste or grease-like consistency. This lubricant would be worked thoroughly through all parts of the bearing. In the rolling of the rollers over their trackways, the grease would be forced into the radial holes and out through the axial bores, thus keeping the ball seats thoroughly lubricated. This chamber may be made sufficiently tight as to have the spaces contained in this chamber practically filled with lubricant.

The parts of the bearing should be so dimensioned that the retainer rings 40 will not have rubbing contact with any part of the bearing except the balls. The bearing thus becomes strictly a floating bearing.

By securing the end-thrust bearing rings directly upon the roller trackway members, the bearing is made self-contained and may be taken out of a wheel and replaced by another, or placed in another wheel. By making the roller trackway members, which members also constitute the casing, separate and detachable from the wheel and axle members, it is possible to make each part of the grade of material which is best adapted to its respective function and the conditions to which it will be subjected. For instance, the roller track-way members should be made of a high temper and hard, which would make them liable to break if subjected to the strains to which the axle is subjected, while the axle may be made of a low temper and of material which is resistant to strains and shocks and not likely to break.

What I claim as my invention and desire to patent is:

1. In a bearing, in combination, inner and outer rings having inner and outer roller trackways formed thereon, rollers fitting between said trackways and provided with ball-seating recesses in their ends, balls in said end recesses, bores connecting said ball-seating recesses with a single point in the periphery of each roller, and end-thrust bearings for said balls.

2. In a bearing, in combination, inner and outer rings having inner and outer roller trackways formed thereon, rollers fitting between said trackways and each having ball-seating recesses in its ends and an axial bore, connecting said recesses, and also having a single bore extending from its periphery to said axial bore, balls in the end recesses, and end thrust members engaged by said balls.

3. In a bearing, in combination, two concentric rings having inner and outer roller trackways formed thereon and adapted for conjoint insertion within and removal from a wheel, rollers fitting between said trackways, each having a ball-seating recess in each end, balls in said recesses, a ball-spacing ring for each set of balls, and end-thrust bearing rings carried by the trackway rings and engaging said balls.

4. In a bearing, in combination, two concentric rings serving as roller trackways and adapted for conjoint insertion and withdrawal from a wheel, rollers fitting between said rings and having ball-seating recesses in their ends, balls in said recesses, a ball-spacing ring for each set of balls, and end-thrust bearing rings for said balls carried upon the roller trackway rings and adjustable axially thereon.

5. In a bearing, in combination, two concentric rings serving as inner and outer roller trackways, rollers fitting between said trackways and having ball-seating recesses in their ends, balls seating in said recesses, ball-retaining rings having holes through which said balls project outwardly, means securing said rings together in fixed relation, end-thrust bearing rings engaging the outer surfaces of said balls and carried directly from the roller trackway rings, said end-thrust bearing rings at one end of the bearing being threaded upon the trackway rings to be adjustable thereon lengthwise the bearing.

6. In a bearing, combination, two concentric rings serving as roller trackways, one of these being adapted to fit over an axle member and the other to be secured within a socket in a wheel, rollers fitting between said trackway rings and having ball-seating recesses in their ends, balls in said recesses, spacing means for said balls and rollers, and end-thrust bearing rings carried by the trackway rings and closing the chamber which contains the rollers and balls.

7. In a bearing, in combination, two concentric rings serving as inner and outer roller trackway rings, rollers fitting between said trackway rings and having ball-seating recesses in their ends, balls seating in said recesses, ball-retaining members, end-thrust bearing rings carried by the roller trackway rings, said end-thrust bearing rings at one end of the bearing being threaded to said roller trackway rings, and locking means for said end-thrust bearing rings consisting of a bar pivoted upon one of the relatively adjustable members, the other of said relatively adjustable members having a series of holes in its face having one side extending to the line between said relatively adjustable members and the member to which said bar is pivoted having a like complemental hole in its edge, and a pin carried by said locking bar and adapted to enter said holes in the relatively adjustable members.

8. In a bearing, in combination, two concentric rings serving as inner and outer roller trackways, rollers fitting between said rings, and having ball-seating recesses in their ends, balls seating in said recesses in the rollers, end-thrust bearing rings carried from the trackway rings and engaging said balls, said trackway rings and the end-thrust bearing rings having a series of holes extending inward from their outer end faces and overlapping the line joining them, a pin adapted to enter said holes when they are brought into registry, and means for yieldingly supporting said pin from one of said rings.

9. In a bearing, in combination, two concentric rings serving as inner and outer roller trackway rings, rollers fitting between said trackway rings, balls serving as end-thrust bearing members for the rollers, end-thrust bearing rings screw-threaded respectively upon the inner and the outer trackway rings to secure adjustment axially of the bearing, each of said attached bearing rings having, one a series of holes extending to the line joining said rings and the other a complemental hole similarly located to register with any one of the holes of said series, a pin adapted to enter said holes to lock the two rings against turning, a bar pivoted upon the ring which has said complemental locking hole and carrying the locking pin, said ring being recessed to receive said bar.

10. In a roller bearing, in combination, two concentric rings spaced apart and serving respectively as inner and as outer roller trackways, rollers fitting between said trackway rings, end thrust bearing rings secured to each end of said rings and overlapping the roller chamber, a flanged cap fitting snugly over the outer ring, and means for holding said cap in place from the axle.

In testimony whereof I have hereunto affixed my signature this 1st day of June 1914.

FREDERICK H. RISLEY.

Witnesses:
PENROSE P. MCELWAIN,
CHARLES L. REYNOLDS.